(No Model.)
C. J. ROBERTS & J. W. OWEN.
ANIMAL TRAP.
No. 520,804. Patented June 5, 1894.
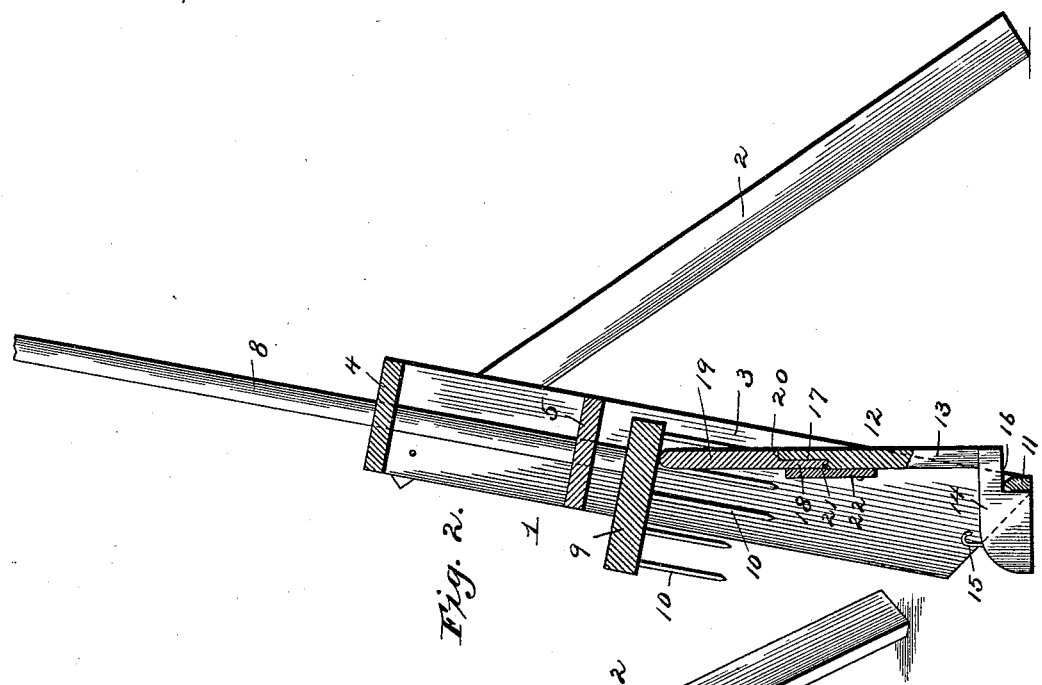
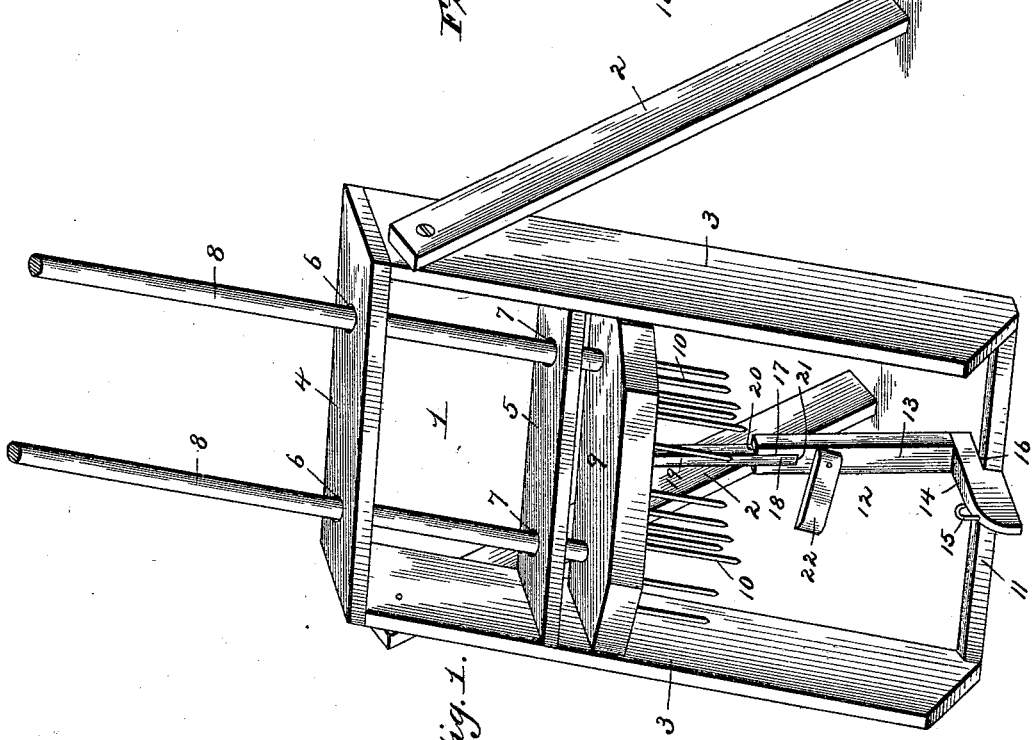
Witnesses
Harry L. Amver
H. P. Riley
By their Attorneys.
Inventors
Charles J. Roberts
John W. Owen
C. A. Snow & Co.
THE NATIONAL LITHOGRAPHING COMPANY,
WASHINGTON, D. C.

UNITED STATES PATENT OFFICE.

CHARLS J. ROBERTS AND JOHN W. OWEN, OF BUFORD, GEORGIA.

ANIMAL-TRAP.

SPECIFICATION forming part of Letters Patent No. 520,804, dated June 5, 1894.

Application filed March 10, 1894. Serial No. 503,168. (No model.)

*To all whom it may concern:*

Be it known that we, CHARLS J. ROBERTS and JOHN W. OWEN, citizens of the United States, residing at Buford, in the county of Gwinnett and State of Georgia, have invented a new and useful Animal-Trap, of which the following is a specification.

The invention relates to improvements in animal traps.

The object of the present invention is to improve the construction of animal traps, and to provide a simple and effective device, capable of readily catching fowls, and other animals attracted by a bait, moles, and the like.

The invention consists in the construction and novel combination and arrangement of parts, hereinafter fully described, illustrated in the accompanying drawings, and pointed out in the claims hereto appended.

In the drawings—Figure 1 is a perspective view of a trap constructed in accordance with this invention. Fig. 2 is a vertical sectional view.

Like numerals of reference indicate corresponding parts in both figures of the drawings.

1 designates an approximately rectangular supporting frame provided with pivoted braces 2, and composed of similar sides 3, having their lower ends beveled, a top cross-piece 4, and an intermediate guide 5, arranged a short distance below the cross-piece 4. The top cross-piece 4, and the transverse guide 5, are provided with aligned perforations 6 and 7, in which are arranged cylindrical rods 8 of a follower 9, which carries spikes 10, and which is guided between the sides of the frame and the transverse pieces 4 and 5. The spikes 10 depend from the lower face of the follower, and are adapted to penetrate and impale an animal and to enter the ground at a mole run to impale a mole.

The supporting frame is provided at its bottom with a transverse bar 11, and the follower is supported in an elevated position for setting the trap by a trigger 12, which is approximately L-shaped consisting of a vertical shank 13 and a foot-piece 14, which carries a bait hook 15, and which is recessed at the heel at 16 to receive the transverse bar 11, and to be supported by the same. The shank 13 is provided at its upper end with a groove 17, which is rectangular, and which receives the lower recessed end 18 of an extension bar 19, forming a continuation of the shank. The recess of the lower end of the extension 19 forms an upper shoulder 20, which rests upon the top of the shank 13; the extreme lower end of the extension is slightly beveled at 21 to fit against or upon the slightly inwardly inclined bottom of the groove 17; and the upper end of the extension 19 is oppositely beveled, and supports the follower, which rests directly upon the same when the trap is set.

To assist in setting the trap, and to avoid any liability of a follower accidentally dropping upon the hands of the operator and injuring him, the shank is provided with a pivoted latch 22, which is adapted to be turned up in operative position, as illustrated in Fig. 2 of the accompanying drawings to close the groove at the outer face of the shank to lock the recessed end of the extension therein. This latch prevents the shank and its extension from breaking at the joint while setting the trap, and when the trap is set, the latch is turned down as illustrated in Fig. 1 of the accompanying drawings, and any pulling at the foot piece incident to an animal attempting to obtain the bait will cause the shank and the extension to break at the joint, and permit the follower to drop by gravity.

The size of the trap should be in proportion to the size of the game desired to be caught.

It will be seen that the trap is simple and comparatively inexpensive in construction, that it is positive and reliable in its operation, and that it is adapted for catching various kinds of animals, such as fowl and the like.

Changes in the form, proportion and the minor details of construction may be resorted to without departing from the principle, or sacrificing any of the advantages of this invention.

What we claim is—

1. A trap, comprising a supporting frame, a follower mounted therein, and a trigger comprising a shank having its upper end grooved and provided at its lower end with an angularly disposed foot-piece rigid with it and carrying a bait hook, and an extension adapted to support the follower, and having its lower end recessed and fitting into the groove of the shank, substantially as described.

2. A trap, comprising a supporting frame provided at its lower end with a transverse bar, a follower mounted on the frame, and a trigger comprising a shank having its upper end grooved, a foot piece arranged at the lower end of the shank and rigid with the same and provided at its heel with a recess receiving the transverse bar of the supporting frame, and an extension supporting the follower in an elevated position and having its lower end fitted in the groove of the shank, substantially as described.

3. A trap, comprising a supporting frame provided at its bottom with a transverse bar, a follower mounted in the frame and carrying spikes, an L-shaped trigger having a rigid foot-piece provided at the heel with a recess receiving a transverse bar, said L-shaped trigger being provided at its top with a groove, an extension bar supporting the follower and having its lower end recessed and fitting in the groove of the trigger, and a pivoted latch mounted on the trigger and arranged to close the groove of the same, substantially as and for the purpose described.

In testimony that we claim the foregoing as our own we have hereto affixed our signatures in the presence of two witnesses.

CHARLS J. ROBERTS.
    JOHN W. OWEN.

Witnesses:
 RIS JAMES H. BRAZIEL,
 W. H. BROZETON.